United States Patent [19]

De Marco et al.

[11] 4,130,736
[45] Dec. 19, 1978

[54] TELECOMMUNICATION SYSTEM WITH KEYBOARD SELECTION

[75] Inventors: Franco De Marco; Constantino Panzeri, both of Milan, Italy

[73] Assignee: Societa Italiana Telecomunicazioni Siemens S.P.A., Milan, Italy

[21] Appl. No.: 853,853

[22] Filed: Nov. 22, 1977

[30] Foreign Application Priority Data

Nov. 24, 1976 [IT] Italy ............................... 29654 A/76

[51] Int. Cl.² ........................................... H04M 3/00
[52] U.S. Cl. ............................................... 179/16 EC
[58] Field of Search ............. 179/18 BE, 16 EC, 2 E, 179/2 EA

[56] References Cited

U.S. PATENT DOCUMENTS

| | | | |
|---|---|---|---|
| 2,665,375 | 1/1954 | Collyer et al. | 179/2 E |
| 3,426,154 | 2/1969 | Finkhauser et al. | 179/16 EC |

*Primary Examiner*—Thomas A. Robinson
*Attorney, Agent, or Firm*—Karl F. Ross

[57] ABSTRACT

A terminal of a radio link or other two-way channel incapable of transmitting d-c signals, extending to a remote exchange, serves a multiplicity of local subscribers having keyboard-equipped telephone sets generating multifrequency selection signals accompanied by a d-c key signal. A detector at the terminal, responding to the arrival of a key signal from a calling subscriber line, connects that line to the outgoing channel to facilitate the transmission of the selection signals to the exchange; upon the arrival of an answer criterion from the exchange, the receiving branch of the channel is extended by another detector to the calling subscriber line.

5 Claims, 2 Drawing Figures

TELECOMMUNICATION SYSTEM WITH KEYBOARD SELECTION

FIELD OF THE INVENTION

Our present invention relates to a telephone or other telecommunication system with subscriber stations adapted to emit multifrequency selection signals in lieu of the more usual dial pulses when initiating a call.

BACKGROUND OF THE INVENTION

In commonly owned U.S. Pat. No. 3,988,547 there has been disclosed a telecommunication system of this type, including a central office or exchange adapted to handle both dial pulses and multifrequency signals. As further described in that patent, a keyboard on a telephone set designed for pushbutton selection has an extra pushbutton whose operation characterizes the accompanying or immediately following frequency combinations as data signals rather than selection signals.

Such extra pushbuttons or equivalent switch means are widely used in practice to prevent the response of central-office equipment to spurious frequency combinations due, for example, to the transmission of sound waves from a nearby radio or from a receiver of piped musical programs. Usually, the pushbutton generates a d-c signal (referred to hereinafter as a key signal) which travels together with the selection frequencies over the associated line loop to a peripheral unit of the exchange and which may take the form of a diminution of the line current normally traversing the loop, brought about for example by the insertion of an additional resistance.

In the case of outlying subscribers communicating with a remote exchange via a radio link or some other channel incapable of transmitting direct currents, such a key signal cannot be sent along with the selection frequencies. Thus, the protection afforded thereby against spurious operations is unavailable in this type of system.

OBJECT OF THE INVENTION

The object of our present invention, therefore, is to provide means for facilitating the use of a key signal with multifrequency dialing even where the subscriber stations communicate with the central office by time-division multiplexing (TDM) or frequency-division multiplexing (FDM) over a channel unable to handle d-c signals.

SUMMARY OF THE INVENTION

We realize this object, in accordance with our present invention, by providing a terminal of such a communication channel (remote from the exchange) with monitoring means connected to the local lines for detecting the arrival of a key signal from any calling subscriber station, the monitoring means controlling call-extending switch means in direct or indirect response to the key signal for connecting the line of the calling subscriber to an outgoing or transmitting channel branch from which it is normally disconnected.

Analogous equipment, i.e. detector means responsive to an answer criterion from the exchange, may be provided in the same terminal to operate other switch means for extending an incoming or receiving branch of the channel to the line of the calling subscriber when a connection to a called subscribed has been established, i.e. before the start of conversation in the case of a telephone network.

BRIEF DESCRIPTION OF THE DRAWING

The above and other features of our invention will now be described in detail with reference to the accompanying drawing in which.

SPECIFIC DESCRIPTION

Figure 1:
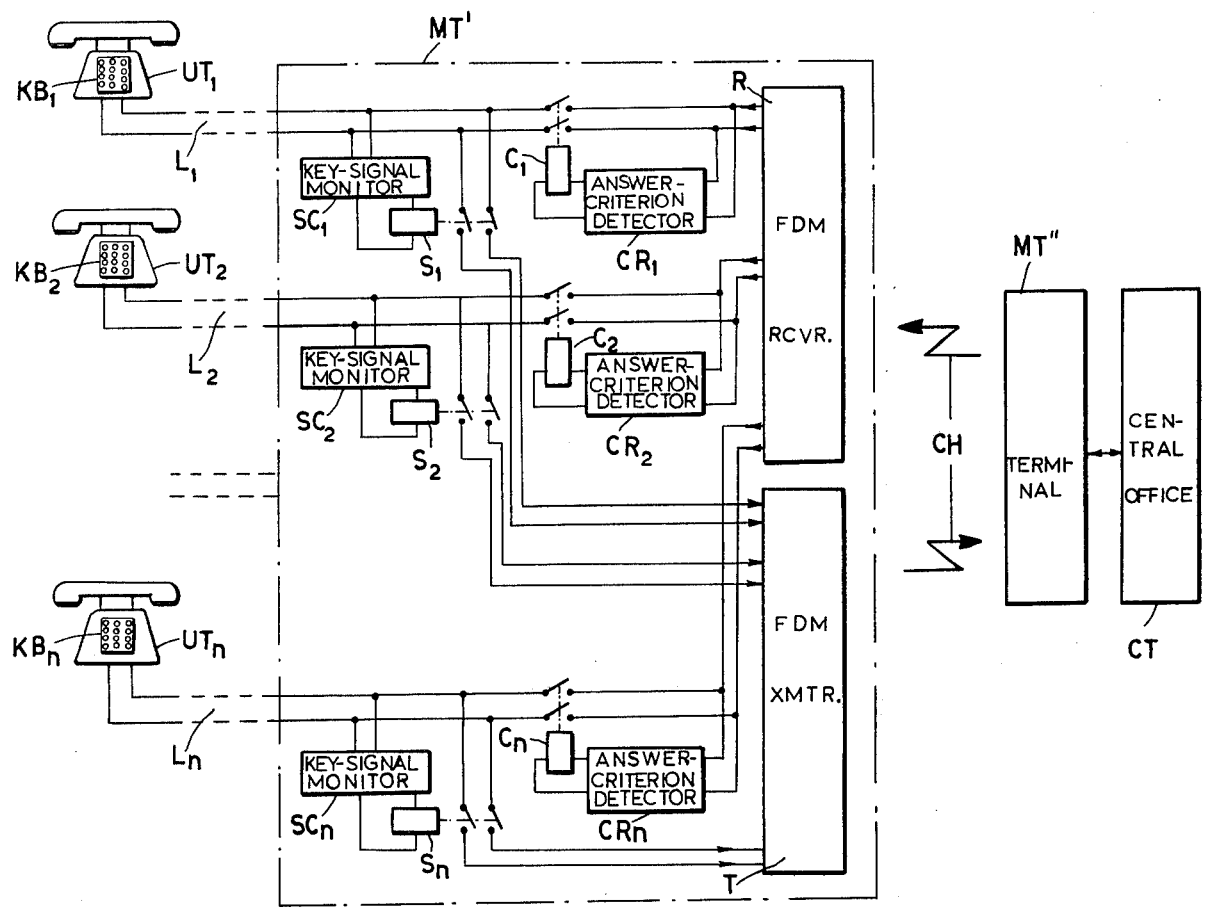
FIG. 1 diagrammatically illustrates a telephone system including a terminal according to our invention.

In FIG. 1 we have shown a multiplicity of telephone sets $UT_1$, $UT_2$, ... $UT_n$ forming part of respective subscriber stations connected with a central office CT via a two-way communication channel CH, here shown as a radio link. Channel CH lies between a subscriber-side terminal MT' and an exchange-side terminal MT''', terminal MT' being connected to the several subscriber stations via respective local lines $L_1$, $L_2$, ... $L_n$. Within terminal MT', each local line feeds a key-signal monitor $SC_1$, $SC_2$, ... $SC_n$ controlling switch means, here shown diagrammatically as relays $S_1$, $S_2$, ... $S_n$, operable to extend the associated subscriber lines to an FDM transmitter T. An FDM receiver R has outputs working into answer-criterion detectors $CR_1$, $CR_2$, ... $CR_n$ controlling other switch means, here shown as relays $C_1$, $C_2$, ... $C_n$, which are operable to extend these outputs to the respective lines $L_1$-$L_n$. The various telephone sets are equipped with keyboards $KB_1$, $KB_2$, ... $KB_n$ having pushbuttons for the generation of frequency pairs representing selected call-number digits, e.g. as described in the aforementioned U.S. Pat. No. 3,988,547 and commonly owned U.S. Pat. No. 3,819,869 mentioned therein.

Let us assume that the subscriber at station $UT_1$ initiates a call in the usual manner by lifting the handset and depressing one of the ten digital pushbuttons of keyboard $KB_1$. With an eleventh pushbutton unoperated, this results in the generation of a key signal together with a pair of digit-identifying frequencies transmitted to terminal MT' via line $L_1$. Monitor $SC_1$, on detecting the key signal, actuates the relay $S_1$ which closes its contacts and connects the line $L_1$ to transmitter T for relaying the digital frequencies to the distant terminal MT'' and thence to the exchange CT. When the latter responds with an answer criterion, indicating that the called subscriber is available, that criterion is picked up by detector $CR_1$ which then actuates the relay $C_1$ to connect the corresponding output of receiver R to line $L_1$. The two subscribers can now converse with each other.

It should be noted that monitors $SC_1$-$SC_n$ need not operate the associated relays $S_1$-$S_n$ immediately upon detecting a key signal but may first send out a start signal to the exchange which thereupon sends back a signal requesting the transmission of the digital frequencies; in that instance, relays $S_1$-$S_n$ may be controlled by the corresponding detectors $CR_1$-$CR_n$. Conversely, relays $C_1$-$C_n$ could be operated by monitors $SC_1$-$SC_n$ upon detection of the end of selection.

Figure 2:
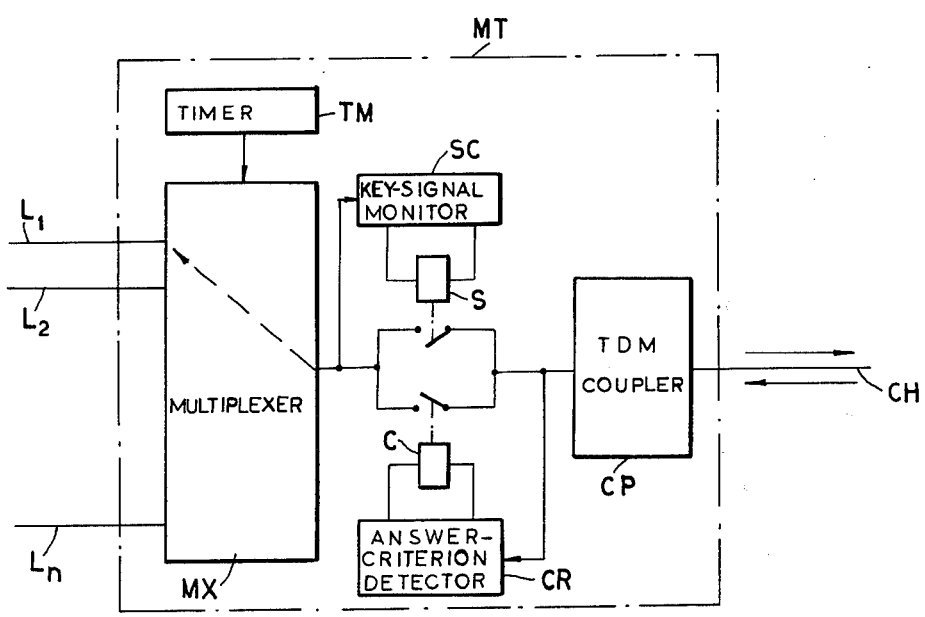
FIG. 2 is a diagrammatic view of a modified terminal embodying our invention.

In FIG. 2 we have illustrated a modified terminal MT operating in the TDM mode, the several subscriber lines $L_1$-$L_n$ being cyclically scanned by a multiplexer MX under the control of a timer TM. If a key signal is detected by a monitor SC during any time slot, a switch S (shown again schematically as a relay) is operated in the same time slot to close a transmission circuit to channel CH by way of a coupler CP. Conversely, an answering signal from the remote exchange arriving in any time slot over channel CH actuates a detector CR which via a switch C extends a receiving branch of the channel by way of coupler CP and multiplexer MX to the corresponding subscriber line.

Units SC and CR in FIG. 2 could also control individual circuit closers associated with lines $L_1$-$L_n$ similar to those represented by relays $S_1$-$S_n$ and $C_1$-$C_n$ in FIG. 1.

Upon the termination of a call, monitors SC or $SC_1$-$SC_n$ restore the associated switches S or $S_1$-$S_n$ to normal in response to the opening of the line loop as the calling subscriber hangs up. Similarly, detectors CR or $CR_1$-$CR_n$ release their relays C or $C_1$-$C_n$ upon the arrival of a disconnect signal from the exchange.

Detectors CR etc. also close their associated switches in the case of an incoming call, in response to a signal from the exchange identifying the called subscriber station. When the latter responds, the corresponding line monitor SC etc. establishes a connection between that station and the outgoing branch of channel CH.

We claim:

1. In a telecommunication system comprising a two-way communication channel extending between a terminal and a remote exchange, and a multiplicity of local lines linking said terminal with subscriber stations equipped with multifrequency generators for the emission of selection signals accompanied by a key signal not transmissible over said channel, said channel having an incoming branch and an outgoing branch both normally disconnected from said subscriber lines;

the improvement wherein said terminal includes monitoring means connected to said local lines for detecting the arrival of a key signal from any calling subscriber station and call-extending switch means controlled by said monitoring means for connecting the line of the calling subscriber to an outgoing branch of said channel normally disconnected therefrom, and detector means at said terminal responsive to an answer criterion from the exchange and other switch means controlled by said detector means for extending said incoming branch to the line of the calling subscriber already connected to said outgoing branch, said monitoring means and detector means being responsive to a call-terminating signal for restoring the switch means controlled thereby to disconnect the line of the calling subscriber from both said branches.

2. The improvement defined in claim 1 wherein the switch means controlled by said monitoring means and by said detector means comprise two sets of switches individually connected to said local lines.

3. The improvement defined in claim 1 wherein the switch means controlled by said monitoring means and by said detector means are in cascade with a multiplexer periodically scanning said local lines.

4. The improvement defined in claim 1 wherein said channel is a radio link, said key signal being of the direct-current type.

5. In a telecommunication system comprising a two-way communication channel extending between a terminal and a remote exchange, and a multiplicity of local lines linking said terminal with subscriber stations equipped with multi-frequency generators for the emission of selection signals identifying other subscriber stations served by the exchange, said channel having a transmitting branch and a receiving branch both normally disconnected from said local lines, the improvement wherein said terminal includes switch means normally disconnecting said local lines from said channel, first detector means monitoring said local lines, and second detector means monitoring said channel, said switch means being operable by said first detector means in response to a signal from one of said local lines to connect same to one of said branches, said switch means being further operable by said second detector means in response to a signal from said channel to connect the other of said branches to a local line identified by the last-mentioned signal, said first and second detector means being responsive to a call-terminating signal for restoring said switch means to disconnect both said branches from the local line previously connected thereto.

* * * * *